US008072337B2

(12) United States Patent
Zank et al.

(10) Patent No.: US 8,072,337 B2
(45) Date of Patent: Dec. 6, 2011

(54) METHOD AND APPARATUS FOR TRACKING AND LOCATING EXPLOSIVES AND EXPLOSIVE MATERIALS WORLDWIDE USING MICRO RF TRANSPONDERS

(75) Inventors: Paul A. Zank, Brookline, NH (US); David W. Buchanan, Brookline, NH (US); Jason C. Julien, Goffstown, NH (US); Karl D. Brommer, Exeter, NH (US); Walter J Fredette, Jr., Concord, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 346 days.

(21) Appl. No.: 12/390,970

(22) Filed: Feb. 23, 2009

(65) Prior Publication Data
US 2010/0231389 A1  Sep. 16, 2010

(51) Int. Cl.
*G08B 13/14* (2006.01)
(52) U.S. Cl. ............... 340/572.8; 340/572.1; 340/10.42; 340/505; 340/539.13

(58) Field of Classification Search ............... 340/572.1, 340/572.8, 10.42, 505, 539.13, 539.22, 693.5
See application file for complete search history.

(56) References Cited

U.S. PATENT DOCUMENTS

| 5,949,335 | A  | * | 9/1999  | Maynard ................... 340/572.1 |
| 6,259,367 | B1 |   | 7/2001  | Klein |
| 6,701,304 | B2 |   | 3/2004  | Leon |
| 6,853,087 | B2 |   | 2/2005  | Neuhaus et al. |
| 7,277,015 | B1 | * | 10/2007 | Morhard et al. ........... 340/572.1 |
| 2005/0073406 | A1 | | 4/2005 | Easley et al. |
| 2005/0131655 | A1 | | 6/2005 | Moolman et al. |

* cited by examiner

*Primary Examiner* — Anh V La
(74) *Attorney, Agent, or Firm* — Daniel J. Long; Robert K. Tendler

(57) ABSTRACT

Stolen or lost explosives are detected by fixing micro RF transmitters in the form of RFID tags to the explosive packaging or embedding them in the explosive material itself. Moreover, the subject microradio transponders may be contained in an adhesive binder or slurry. The identity of the explosive, its place of manufacture and ownership is detectable by RFID tag interrogators strategically located along commonly used roads or railways in which the RFID tags scavenge energy from interrogation beams, with the RFID tags indicating the identity of the explosive and its origin.

34 Claims, 9 Drawing Sheets

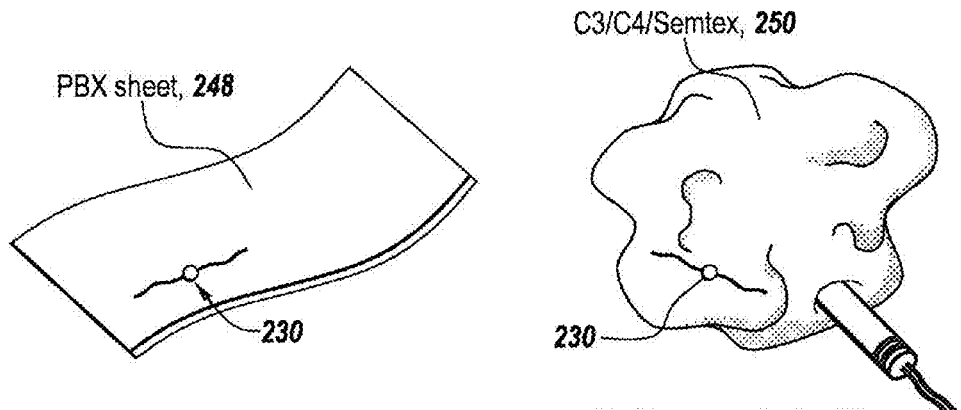
*Fig. 11F*  *Fig. 11G*
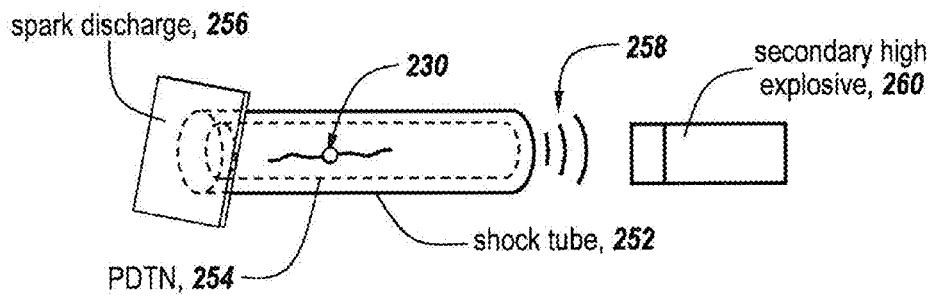
*Fig. 11H*
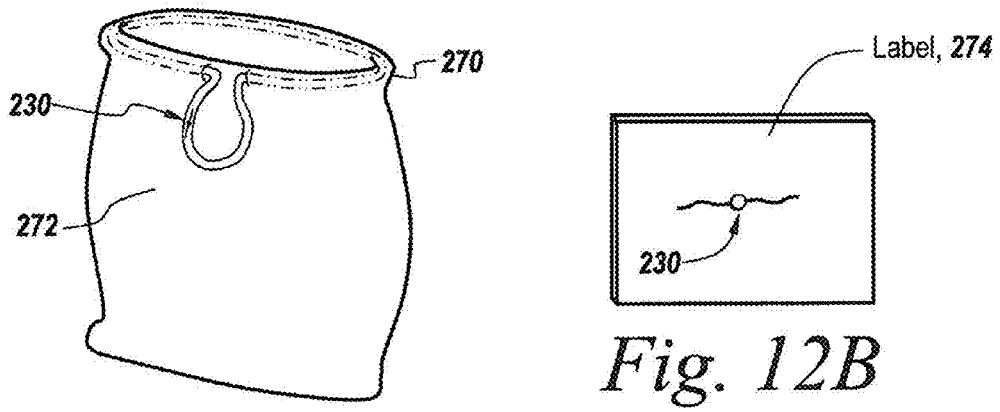
*Fig. 12A*  *Fig. 12B*

METHOD AND APPARATUS FOR TRACKING AND LOCATING EXPLOSIVES AND EXPLOSIVE MATERIALS WORLDWIDE USING MICRO RF TRANSPONDERS

FIELD OF INVENTION

This invention relates to the tracking of explosives and explosive materials and more particularly to the utilization of micro RF transponders in the tracking process.

BACKGROUND OF THE INVENTION

There is a worldwide problem of tracking and detection of explosives. Over two million metric tons of explosives are manufactured in the United States every year. Several tons are lost or stolen each year This puts into play the problem of being able to sense the movement and location of explosive material, whether stolen or not, and in the past the documentation for the explosives has been spotty at best. In general, shipping documents have been utilized to identify the explosives and their origin. However, shipping documents alone when generated may be improperly generated or may be fraudulent; and the explosives themselves may be separated from the shipping documents.

As illustrated in US Patent Publication 2005/0131655 by Moolman et al a method is provided for logging the use of non-electric detonators in which the identity data of a detonator is recorded at the time the detonator is being loaded into blast hole. Moreover, the consumption of the detonator is recorded and the system relates the identity data associated with the detonator to an inventory of non-electric detonators to allow inventory updating. However, it will be seen that providing inventories and inventory lists are not capable of monitoring and tracking explosives. Secondly, and most importantly, there is a class of explosive detonators which are electric. Providing electronic tracking apparatus for electric detonators was thought to be dangerous, as it was thought that transmissions could ignite the explosives.

Note that explosive materials can be in blasting caps, spooled energetics, boosters, PBX sheet, C4 explosives, and shock tubes to name just a few explosives.

Thus, a methodology needs to be developed which affords worldwide localization and identification of explosive materials without increasing the inherently dangerous. Specifically, the tracking system cannot result in inadvertent activation. Moreover, there needs to be a system to monitor the explosive materials entire life cycle from manufacture through storage to ultimate use, in which the explosives are to be logged and traced. Moreover, it is a requirement that the detected material be tracked back to the manufacturer of the explosive material or forward to the intended users of the material.

It is important not only to be able to be able to track the explosives themselves which are packaged and ready for use, it is also important to be able to track and identify the explosive material itself, such as for instance C4 explosive, or even ammonium nitrate used to make explosives. Therefore, it is a requirement to be able to detect the existence and location of explosive material and then to identify its source. As a result, one can then identify stolen explosives or identify what explosives have been used or are going to be used.

The use of so-called RFID tags that are microscopic in size has been proposed to identify objects. One patent that utilizes RFID tag technology is U.S. Pat. No. 6,259,367 which provides a method for identifying and returning an object by affixing to the object a passive two way communication circuit such as a frangible radio security tag or a smart label. RFID tags have been used in so-called smart cards as illustrated in U.S. Pat. No. 6,853,087. A system for providing container security by measuring various parameters of the material within the container is described in US Patent Publication 2005/0073406.

As to RFID tags and particularly smart dust, an article in Intelligent Enterprise of Jul. 18, 2003 describes RFID tagging of inventory, such as for instance razorblades, and has suggested an updatable RFID tag being embedded in high value currency or bank notes to combat counterfeiting and money laundering. As described in this article, smart dust takes the concept of a simple RFID circuit, replacing the barcode label, and extends it to embedding an entire computer in a microscopic package. Note, in Computer World on Mar. 24, 2003 in an article by Thomas Hoffman, the ability to scatter hundreds of tiny sensors around a building to monitor temperature or humidity is described. Also, a system for deploying pixie dust is said to involve a network of minuscule remote sensor chips to track enemy movements in a military operation.

The definition of smart dust according to this article are devices that are tiny wireless micro electromechanical sensors, MES, that can detect everything from light to vibrations. These devices, termed "motes", are said to be available in the size of a grain of sand and each could contain sensors, computing circuits, bi-directional communication technology and a power supply.

Moreover, the University of California Annual Financing Report of 2003 refers to the smart dust work of Professor Christopher Pister in which a defense contractor in San Diego has become a Dust Networks customer using the technology for perimeter security systems.

Additionally, in an article entitled "FutureTech" written by Bill Robinson for Gateway 2 Russia, he opines that smart dust is becoming something that will eventually end up as an RFID tag based distributed sensing smart dust system.

Further, U.S. Pat. No. 6,615,074 relates to apparatus for energizing a remote station through the irradiation of a device by a remote energy source.

Note also in the Wall Street Journal of Thursday Jul. 7, 2005 Italian parmesan makers use technology to track authenticity and quality of their cheese using RFID tags embedded in the rind of many of the freshly made wheels of cheese that they sell.

More importantly, and incorporated herein by reference is Patent Publication 2007/0281657 entitled "Microradio Design, Manufacturing Method and Applications for the Use of Microradios" which is assigned to the assignee hereof.

In this Patent Publication a micro radio design is described which is small enough to be able to extend the RFID tag technology to smart dust applications. This patent Publication, as well as US Patent Publication 2007/0085689, also incorporated herein by reference, indicate the tagging of various objects. However monitoring of the manufacturer and travel history of explosives or explosive materials is not discussed. While US Patent Publication 2007/0281657 describes the use of the micro radios to detect improvised explosive devices (IEDs), the manufacture and travel history of the IEDs is not discussed.

Thus, it will be appreciated that the aforementioned patent publications do not describe how to trace explosives and identify their origin during their whole life cycle.

SUMMARY OF THE INVENTION

A method in the system is described for detecting and identifying explosives during the entire life cycle of the explosive by embedding or fixing a micro radio of submicroscopic size to the explosive or embedding it in the explosive material itself. It is important that the micro radio be embedded or fixed to the explosive device or explosive itself during manufacture to afford worldwide localization and identification of the explosive material.

The utilization of micro RF transponders provide extremely low levels of RF radiation and can be used safely around and in explosives. Moreover, the RF transponders remain passive until interrogated and are virtually invisible to the unaided eye. In one embodiment, the transponders are placed discretely within the packaging of the explosive during manufacture; or are integrated into the explosive material itself. The micro RF transponders are readily interrogated when used for instance within shipping labels for energetic materials, as well as within any portion of the packaging material or embedded in the material itself.

The micro RF transponders can remotely interrogated at any time, easily determining explosive location, explosive type, manufacture, date code and country of manufacture to name a few of the types of information that can be loaded into the micro RF transponder at the time of manufacture.

As part of the subject invention, interrogation units are strategically placed along well traveled roads or in areas where it is suspected that explosives are transported or used. These points are monitored regularly so that stolen or misplaced explosives can be located. Since the micro RF transponders are more efficient and have greater range than standard RFID tags, they can be detected at relatively long distances, with the range depending upon the intensity of the interrogating source. Of course, the higher the power of the interrogating source, the more power that is radiated back from the tag, as the tag can scavenge more energy for powering the transponder. Signal coding and processing provide very large increases in signal to noise without increased power levels.

Also, and as described in US Patent Publication 2007/0085689, interrogation can be accomplished by over flying an area and projecting interrogating radiation down to the earth.

In this way, providing micro RF transponders with explosives or with explosive material permits monitoring of all types of explosives from manufacturing point to usage.

The micro RF transponders are also small enough to be internal constituents of packaging or shipping label adhesive. If for instance a label is torn from a package containing explosives to prevent tracing, if the explosive is tagged with the subject microradio transponders, the container and its contents itself will remain capable of being interrogated, tracked and located. The micro RF transponders may also be placed directly adjacent to energetic material within metallic packages in which the presence of the metal enhances range. In this way the subject microradio transponders can be placed on cartridge dynamite or in foil packaged plastic compositions.

The micro RF transponders may also be invisibly placed within shipping spools that hold det-a-cord (detcord), det-a-line or query cord, as well within other types of detonators. Micro RF transponders are easily hidden in plain sight within wrappers of electric and nonel blasting caps, and may be included within the delay decade and timing labels on the cap's lead-in lines themselves. The subject micro RF transponders are readily integrated within the stand off media used with linear shaped charges, within the labels and cardboard shells of boosters, and within the labels and shells of perforators on primers. The subject micro RF transponders may also be embedded within the outer and inner separation wrappers of datasheets, especially letter quality, or within the outer or inner wrappers of any of the multitudes of various PBX sheet or dough-like C3/C4/SEMTEX compositions.

Additionally, micro RF transponders may be placed within bag lining materials containing fertilizer grade or industrial grade high and low density ammonium nitrate prills or within the linings or labels of commercial premixed 50 pound bags of ANFO; or in fact within any bulk package of explosives.

The micro RF transponders also permit easy tracking of non-mixed binary explosive components and their respective containers. These micro RF transponders also easily lend themselves to locations within wooden or cardboard spools of shock tube of nonel/non electric lead-in line or any spooled energetics. Moreover, the micro RF transponders can be readily integrated into duplex wire reels utilized in electric command detonation. Moreover, the subject micro RF transponders may be located within any of the multitude of commercial and military blasting machines themselves.

It is noted that emplaced micro RF transponders have zero effect on the functionality of the energetic material, yet allow remote traceability and identification, all extremely discretely and safely accomplished and without the user's knowledge.

There are three specific approaches to place and locate micro RF transponders within the explosive materials and the associated materials utilized to package, support or transport these items.

First, one places a self enclosed micro RF transponder on or within the non-metallic material of any packaging, or within any type of transportation container utilized for energetics and or energetic initiating systems. In one embodiment the micro RF transponder is physically placed within a tag/packing label. This transponder has, in one embodiment, a small dipole antenna resulting in a total transponder size of 300 mm×100 micron×100 microns to provide a device the size of a small whisker. This whisker can be readily embedded anywhere within the external wrappings and external packing of explosives. Even fertilizer grades of commercially available ammonium nitrate can be tracked, interrogated and monitored using the microradio transponder.

The microradio RF transponders can also be placed within the seals utilized to close packages, boxes and crates, within the strings closing bags of ANFO (ammonium nitrate fuel oil premixed), within the decade/delay coated labels wrapped around electronic lead wires or around the decade/timing labels for non-electric detonators, surface delays and timing control devices. The same locations for the micro RF transponders are utilized in one embodiment on non-electric lead in line labels, on shock tubes, or within any of a multitude of boosters/primer labels. They may also be used within dynamite cardboard-like stick explosive casings, within cartridged or bulk emission bags in which large sausage-like casings contain mixed constituents of gels and slurrys.

The subject micro RF transponder and associated whiskers can also be placed within labels or within any part of the physical packaging of binary explosives or their containers. Micro RF transponders readily meld themselves invisibly into stand off materials, typically porous self adhesive foams used in modern linear shaped charges, precursors and primary charges for military and commercial blasting as well as controlled precision blasting and cutting operations. The micro RF transponders can also be embedded in breaching and or cutting devices that meet the extreme needs of explosive space vehicle separation mechanisms; may have a sublime application such as in trenching, demolition, and EOD support. Note that the energetics utilized may all be tracked discretely because the subject micro RF transponders is invisible to the unaided eye Secondly, one can place the subject micro RF transponder on the surface of a metallic material, with the transponder having a small dipole antenna. The result is enhanced radiation due to its proximity to metal, thereby increasing transponder detection range. This metallic material could also be the wire on a bulk bag seal, or metallic hinges on crates, or bulk packaging cases. By utilizing a metallic packaging label, or a holographic label, or indeed retro reflective labels, the effective range of interrogation and location of the micro RF transponders is greatly enhanced.

In one embodiment, an ultrathin metallic backplane is made integral to the micro RF transponder's construction. Moreover, when the micro RF transponder utilizes dipole whiskers, one obtains enhanced detection ranges based on the micro RF transponders co-location to the metallic back plane. Note that between the ultrathin backplane and the micro radio is a small dielectric layer between the dipole and the metallic object creating a structure similar to a microstrip patch antenna.

Finally, one may use the subject micro radios in a conductive adhesive to attach the micro RF transponders to metallic objects containing explosives or explosive initiating systems by fastening the micro RF transponder to any conductive metal object with appropriate dielectric insulation. Note, in one embodiment that the overall size of the microradio transponder can be as small as 20 microns because it uses a metallic object as its transmit/receive antenna.

This application allows the micro RF transponders to be located and or embedded emplaced or otherwise provided on any metallic explosive object from blasting caps, metallic cased boosters, the copper flashing liners of shaped charges, on the lead linings of high grain loaded LSC's or on any metallic explosive container for military or commercial explosive products such as perforators, jet tappers, explosively actuated cable cutters and foil wrapped packages of military composition.

As will be appreciated such micro RF transponders can be entrained in a spray adhesive in which spraying of the adhesive attaches the micro RF transponders discretely and covertly, or overtly to an object.

In summary, stolen or lost explosives are detected by fixing micro RF transmitters in the form of RFID tags to the explosive packaging or embedding them in the explosive material itself. Moreover, the subject microradio transponders may be contained in an adhesive binder or slurry. The identity of the explosive, its place of manufacture and ownership is detectable by RFID tag interrogators strategically located along commonly used roads or railways in which the RFID tags scavenge energy from interrogation beams, with the RFID tags indicating the identity of the explosive and its origin.

In a fuller embodiment, the micro RF transponders are undetectable by the unaided eye and are in the form of a whisker that constitutes both an RFID dipole and includes a non-linear detecting element such as a diode which is powered by the interrogating beam and which outputs a distinctive ID signal back to the reader.

In one embodiment, the micro RF transponders are self contained and are enclosed in a dielectric material used for packaging the explosive.

In another embodiment, the RF micro transponder is adhesively attached to a metal substrate for increasing range.

In a third embodiment, the nearly invisible tags are entrained in adhesive which is either sprayed on or in slurry form, with the micro RF transponders being located adjacent, explosive material such as ammonium nitrate. The nearly invisible tags are provided on backscattering label, on spooled energetics, in booster packaging, on shock tubes, in PBX sheet, and may be embedded in C3/C4/SEMTEX explosives. The micro RF transponder may also be incorporated in drawstrings for bags carrying explosive material, sealing rings for explosive containers, or wrapped around detonator lead wires or in stand-off packaging materials, with the stealth nature of the tags defying easy detection by those seeking to transport stolen explosives.

BRIEF DESCRIPTIONS OF THE DRAWINGS

These and other features of the subject invention will be better understood in connection with the Detailed Description and in conjunction with the Drawings of which:

Figure 7:
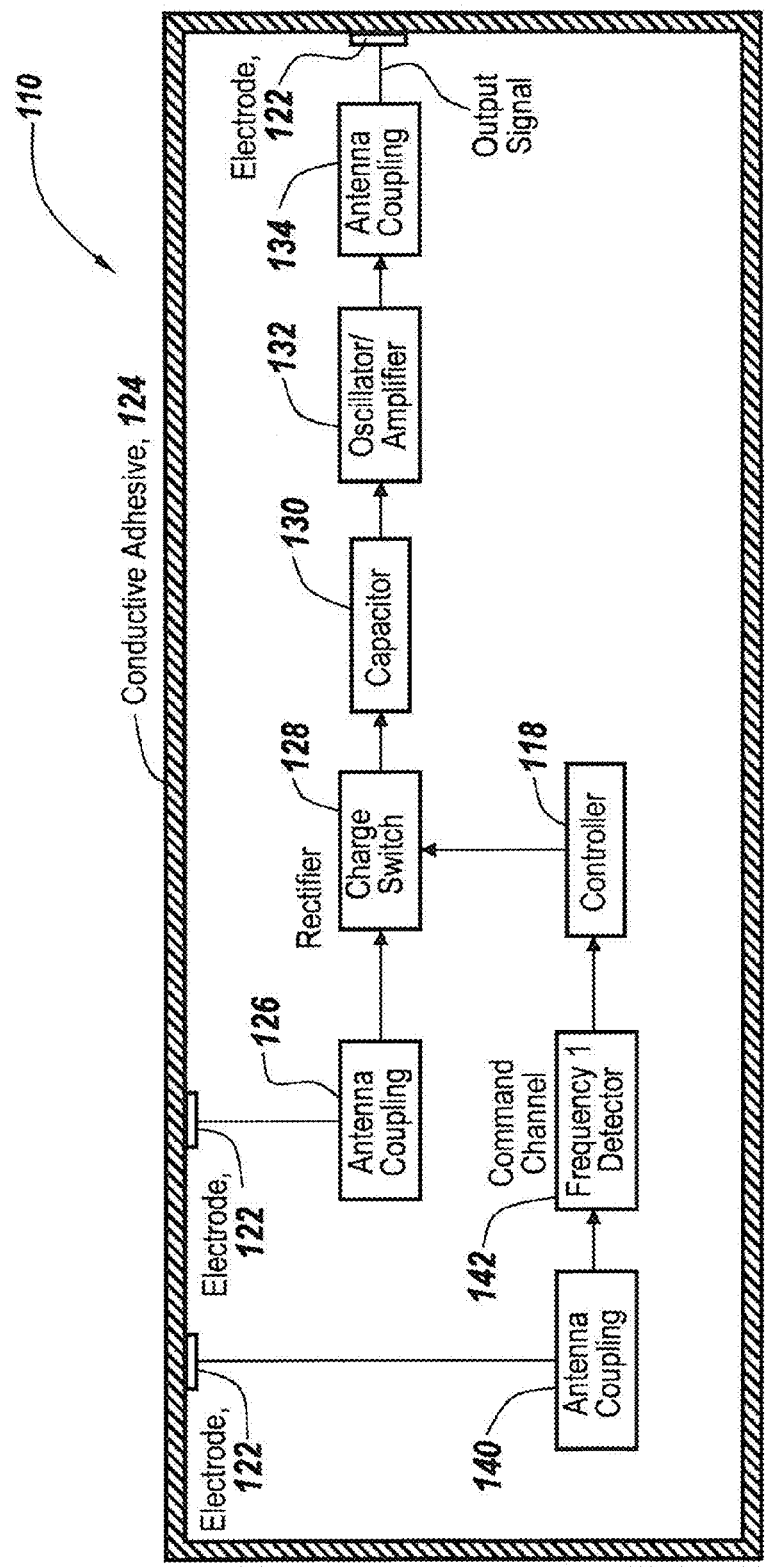
FIG. 7 is a diagrammatic illustration of an encapsulated micro RF transponder module including both rectenna circuits and command channel circuits, along with an oscillator/amplifier and antenna coupling in which the module may be adhesively attached to a substrate using a conductive adhesive.
Figure 8:
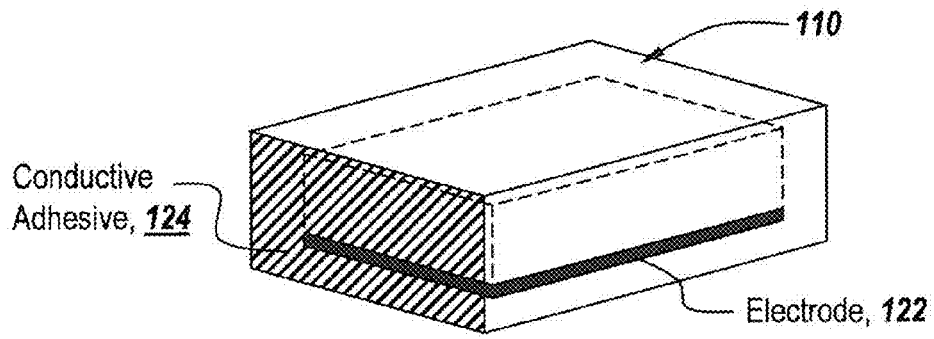
Figure 9:
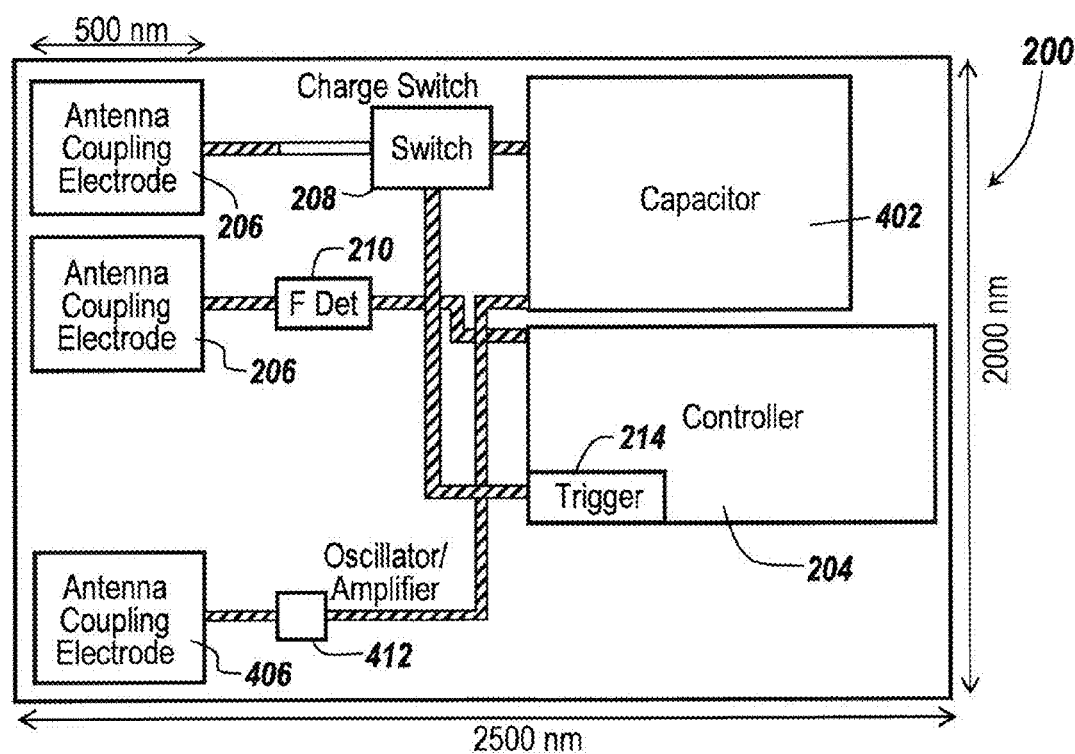
Figure 10:
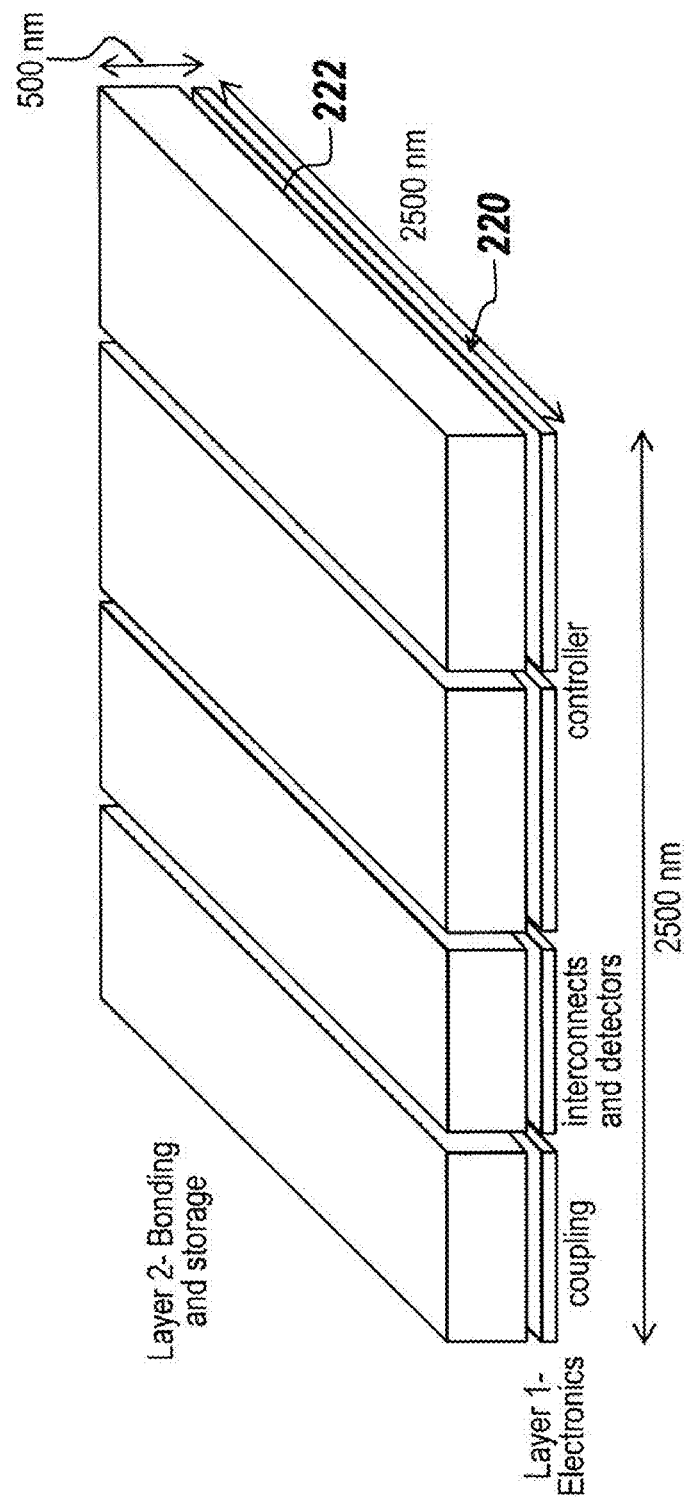

FIG. 8 a diagrammatic illustration of the module of FIG. 7 in which an electrode is used to contact the conductive adhesive of FIG. 7;

FIG. 9 is a block diagram of an exceptionally small RFID tag having a charge switch, an oscillator/amplifier, a capacitor for storing the scavenged energy and a triggered controller for controlling the response of the tag to an interrogation signal;

FIG. 10 is a diagrammatic illustration of an exceptionally small RFID tag utilizing two layer bonding; and, FIGS. 11A-H illustrate various explosives and explosive packaging to which the subject microradio transponders may be adhered or embedded;

FIGS. 12A-E are diagrammatic illustrations of an embodiment wherein the microradio transponder is situated at a non-metallic material.

Figure 13A:
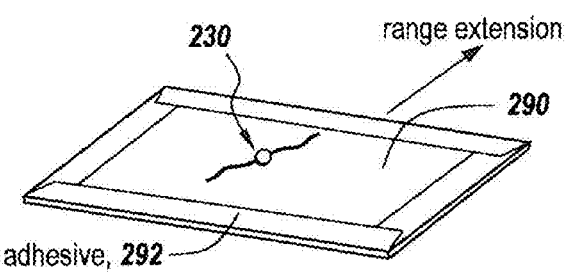
Figure 13B:
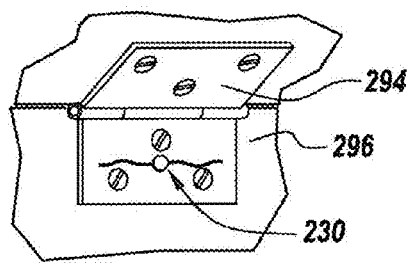
Figure 14:
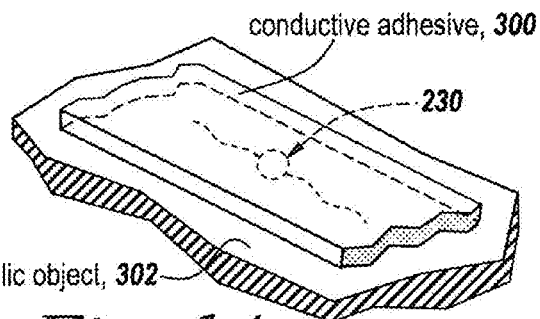

FIGS. 13 A and B are diagrammatic illustrations of embodiments where the subject microradio transponder is adhered to a metallic material that provides a ground plane to increase range; and, FIG. 14 is a diagrammatic illustration where the subject microradio transponder is embedded in an adhesive slurry or spray;

DETAILED DESCRIPTION

Figure 1:
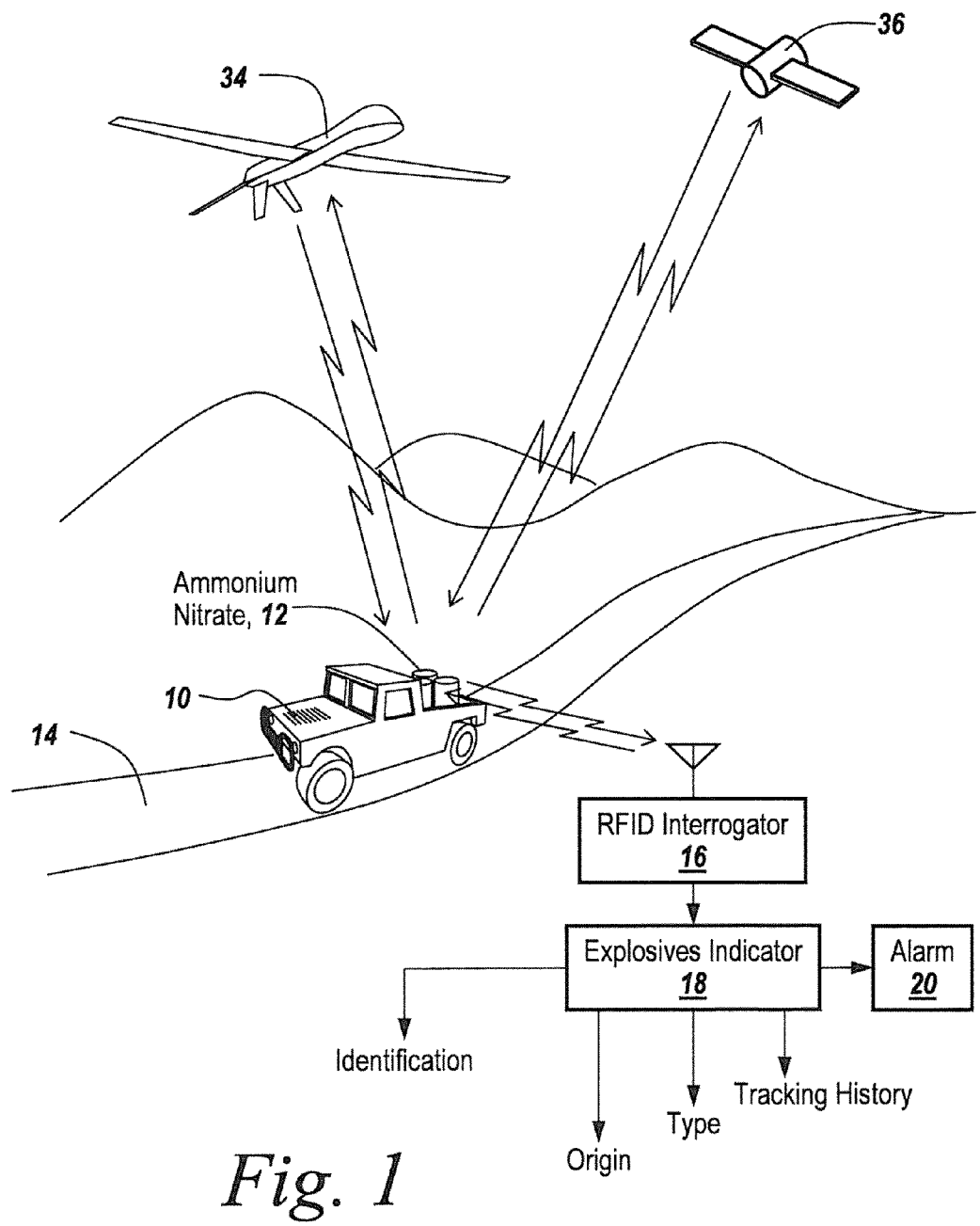
FIG. 1 is a diagrammatic illustration of the detection and identification of explosive materials or explosives utilizing either roadside interrogators, airborne interrogators, or satellite interrogators.

Referring now to FIG. 1, a truck 10 carrying canisters 12 of ammonium nitrate is shown proceeding along a road 14 which is monitored in one embodiment by an RFID interrogator 16. Upon passing the RFID interrogator, an explosives indicator 18 is driven by an output of the RFID interrogator to indicate the presence and identity of the explosive, its origin, its type, its tracking history and optionally activates an alarm 20 indicating that unauthorized explosive transport has occurred.

Submicroscopic Microradio Transponders

Prior to describing the application of RFID tag microradio transponders for monitoring explosives from point of manufacture to use, the following describes RFID microradio transponder technology usable in the subject application. While RFID tags have existed in the past, it is important to the subject invention that the tag itself be nearly invisible so that its presence on or at an explosive is not readily apparent. Because of its near invisibility it is extremely unlikely that the tag would be undetected by an individual handling the explosive, and therefore the likelihood of their removal is extremely remote.

As described hereinabove, in one embodiment a microradio transponder usable in the subject invention includes an antenna 22, a filter at a first frequency 24, a rectifier 26, a hysteretic switch 28 and oscillator 30 which outputs a signal at a second frequency 32 that is radiated back out antenna 22. Thus frequency F1 is used to charge the circuits in the microradio transponder, whereas the frequency F2 is used to transmit intelligence back to the RFID interrogator.

Because of the long ranges at which the subject RFID microradio transponders can be made to operate, the existence of stolen or misplaced explosives can be detected by overflying aircraft 34, or indeed satellites 36, whereby worldwide tracking of explosives or explosive materials is possible.

Figure 2:
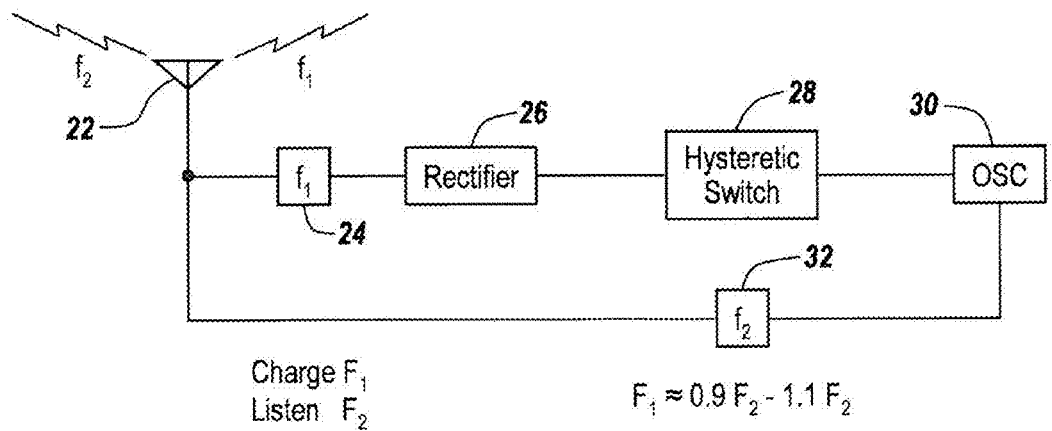
FIG. 2 is a block diagram of a microradio transponder in the form of an RFID tag involving the utilization of a rectifier, a hysteretic switch and an oscillator in which the RFID tag used for the explosive is interrogated at one frequency and transmits at a different frequency.

The form of the micro RF transponder varies depending on the application. The simplified rectenna circuit of FIG. 2 describes the minimal circuitry sufficient to provide the identity of the tag and in one embodiment is detectable at ranges in excess of 500 feet.

Depending on the RF micro transponder utilized, the transmissions from the transponders can be heard by overflying aircraft which provide parasitic powering by irradiating an area on the surface of the earth with for instance a 100 kilowatt signal.

Likewise, various areas on the surface of the earth may be surveyed by a satellite that produces enough energy to power the microradios and thereby provides a worldwide listening capability for explosive materials.

Figure 3:
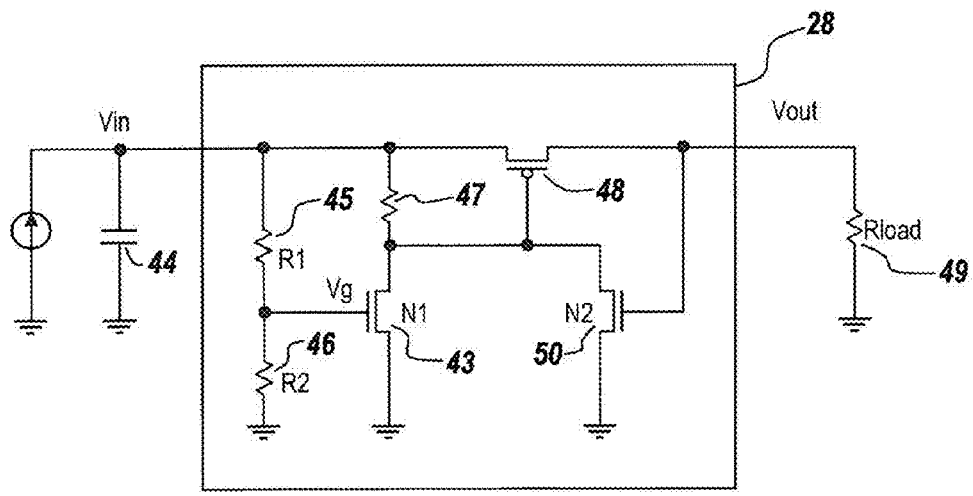
FIG. 3 is schematic diagram of the rectifier circuit of FIG. 2.

The reason for a hysteretic switch is described in FIG. 3. It is noted that it is the purpose of the hysteretic switch is to allow the final capacitor within a rectifier to charge up for a relatively long period of time before the hysteretic switch goes into conduction and passes the power from this capacitor to the oscillator used in the microradio. The result is a powering cycle that causes a capacitor to charge up to a threshold point at which the capacitor rapidly discharges through the oscillator. The result is a charging interval that is much longer than the transmit interval.

In one embodiment the hysteretic switch includes two CMOS PFET transistors in which a transistor 43, here labeled N1, senses a voltage at a capacitor 44 by having its gate coupled to a voltage divider coupled between the capacitor and ground as shown by resistors 45 and 46. Note that a pull up resistor 47 is provided. Note also that when the gate voltage $V_g$ of transistor 43 is greater than a predetermined voltage then the gate of PFET transistor 48 is such that transistor 48 connects capacitor 44 to a load 49 which in this case is oscillator 30.

A PFET transistor 50 keeps transistor 48 in its conductive region to hold it on until capacitor 44 discharges below the useful supply voltage level to the oscillator load 49.

In one embodiment, it is the goal of the hysteretic switch to switch on when the input voltage is greater than for instance than 1.5 volts. Note it is desired that the rectified power provide up to two volts across the output capacitor, which in one embodiment is a two microfarad capacitor.

When the storage capacitor is being charged up, the hysteretic switch is open. When the threshold or trip point is exceeded, the hysteretic switch connects the capacitor to the load, in this case the oscillator. The load then draws current from the capacitor and beings to discharge it. In one embodiment, when this capacitor voltage drops below the threshold voltage, the hysteretic switch stays on. When the capacitor voltage drops below for instance 1 volt, the switch disconnects the load from the capacitor, the capacitor starts to charge up, and the cycle repeats.

Figure 4:
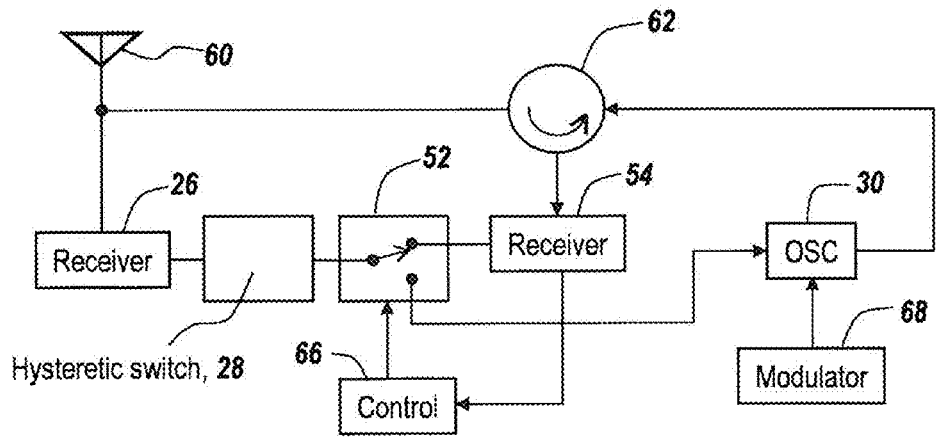
FIG. 4 is a schematic diagram of a microradio which includes a receiver that receives a predetermined access code and a modulated oscillator which modulates the signal from the tag in accordance with the information associated with the tag.

Referring now to FIG. 4, a block diagram of a microradio is shown that includes both a modulated oscillator and a receiver section for detecting command signals and for causing power to be applied to the oscillator after receipt of a command signal.

However if one does not wish to employ command signaling the microradio nonetheless includes a rectifier 26, a hysteretic switch 28 and an oscillator 30.

However, if one wishes to have control signaling, one needs to have the output of hysteretic switch 28 coupled to a single pole double throw switch 52 to in the first instance, establish a listening time period, which is established by powering receiver 54. Upon powering of receiver 54 the receiver is coupled to antenna 60 by virtue of circulator 62.

Upon receipt of command signals, receiver 54 is operably coupled to control 66 switch 52 to switch power to oscillator 30 so as to activate oscillator 30 to provide a signal back through circulator 62 to antenna 60. Oscillator 30 may be modulated by a modulator 68 for providing whatever information is required to be transmitted from the microradio transponder, given the receipt of control signals for the microradio to do so.

Figure 5:
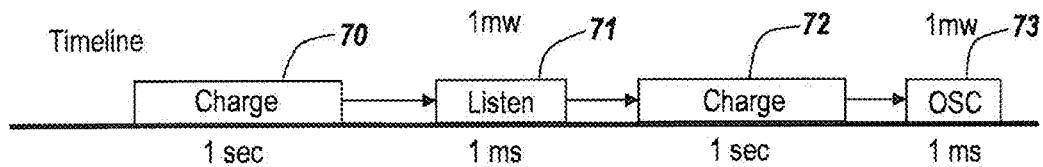
FIG. 5 is a diagrammatic illustration of the timeline for charging, listening and powering the oscillator for the circuit of FIG. 4.

As can be seen from FIG. 5, the timeline for the charging and transmissions includes a charging period 70 which may be on the order of a second and which allows a final capacitor in rectifier 26 to be charged, for instance to one microjoule. Thereafter as illustrated at 71 there is a listening portion of the timeline that may offer a short 1 microsecond to perhaps 1 millisecond listening time slot. In one embodiment, the command receiver consumes approx 1 milliwatt to power the microradio's receiver for the listening operation. The command period enables reader authentication and timing synchronization with the microradio. Thereafter, there is a 1 second charging interval, here illustrated at 72, followed by a short period 73 of approximately 1 millisecond duration for the oscillator to generate a 1 milliwatt burst.

Thus, one embodiment includes developing an optimal charging/transmit cycle timeline for maximum microradio range in which one charges the final capacitor, for instance, for one second, after which one would listen for command signals during a 1 millisecond time period, again charging the capacitor for 1 second and then powering the oscillator for 1 millisecond.

By use of this cycling one can charge the capacitor from the parasitic coupling for relatively long periods of time, whereupon the device can listen for instructions from the outside world and emit a short burst, followed by another charging period, and another burst. This charging regime is very effective for parasitically powered microradios and is available for any microradio application to provide maximum range.

Figure 6:
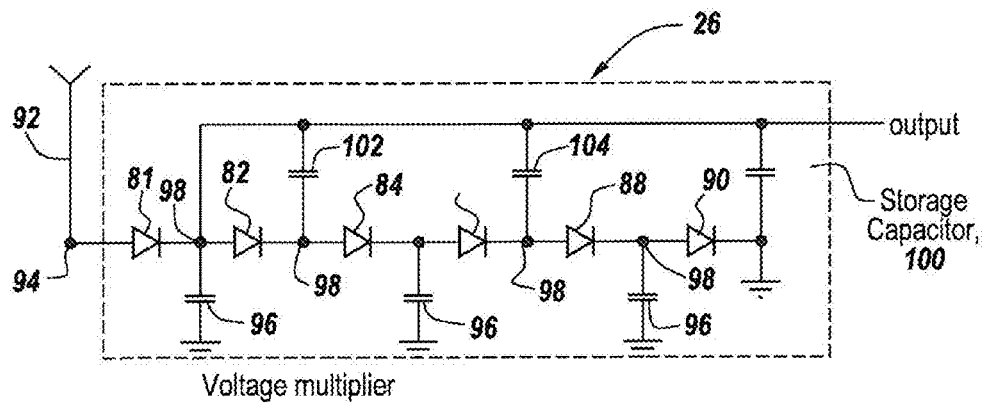
FIG. 6 is a diagrammatic illustration of the rectifier circuit of FIG. 2 illustrating a multi-diode rectenna circuit that provides voltage multiplication and an increased output voltage from the scavenging of energy in the interrogation beam which irradiates the tag.

Referring now to FIG. 6, when a rectenna voltage multiplier circuit is used the rectenna type circuit, voltage multiplication extends the range of the microradio transponder itself so that it may be detected by overflying aircraft and in fact satellites.

In FIG. 6, in one embodiment rectifier 26 is a voltage multiplier incorporating diodes 81, 82, 84, 86, 88 and 90 coupled in series to an antenna 92 feed point 94.

The stages of the voltage multiplication are provided by a capacitor 96 to ground between the output of a previous diode and the next diode such as indicated at points 98. The output of diode 90 is directly coupled to final stage capacitor 100, where capacitors 102 and 104 accumulate respectively the outputs of diodes 82 and 86 such that the charges on capacitors 102 and 104 are applied across storage capacitor 100 and ground. The operation of voltage multiplication results in a charge on a final storage capacitor which is much larger than one would have if one did not have the voltage multiplication.

As to the near invisibility of the subject microradio transponder, and referring now to FIG. 7, what is shown is the layout for a nanoscale microradio. FIG. 7 shows a 2,000 by 2,500 nm device which utilizes nanoelectronic components. Here microradio 110 is comprised of electrodes 122 which connect the circuits within a module to a conductive adhesive coating 124, which when adhered to an antenna connects the internal circuits of the module to the antenna.

In cases where a protective coating prevents direct conductive coupling with the target antenna, electrical coupling is possible using capacitive, inductive or radiated techniques, usually at the cost of greater insertion loss and consequent higher stored energy requirements.

In one embodiment an antenna coupling 126 is utilized to couple the radiated energy from the antenna to a rectifying circuit 128 which may be a nanotube rectifier incorporating a single electron transistor. The output of the rectifying circuit is coupled to a capacitor 130 which is constructed from thin plates that are used to fabricate nanoelectrodes, with the capacitor in turn coupled to an oscillator/amplifier 132 which many include a nanowire resonant tunnel diode or a transistor for RF purposes, or a high efficiency quantum dot LED or small laser, for instance, a quantum cascade laser for infrared purposes. In the illustrated embodiment, the output of the oscillator/amplifier is delivered to an antenna coupler 134 that is connected to electrode 122 to couple out the signal available at the output to the conductive adhesive coating 124.

The device thus formed is a microscopic parasitic device that derives its power from rectifying the RF energy at the surface of an antenna. In the IR case, the rectifying circuit may also be utilized to rectify optical energy charged to capacitor 130, or it may rectify radio frequency energy from a nearby radio transmitter used for communications or radar.

What will be appreciated is that through nanotechnology one can provide a nearly invisible module that can be adhered to or placed adjacent explosives or explosive material.

As for specifically detecting a microradio transponder when for instance, searching for a particular explosive, in one embodiment; the receiver includes an antenna that couples radiation incident on the antenna to a frequency detector 142 tuned to a command link frequency. The frequency detector is a simple pulse detector in order to facilitate implementation at the nanometer scale. Pulses detected by the frequency detector 142 are output to a control 118, with a simple pulse pattern being provided as a rudimentary command set. As will be appreciated, frequency detectors can conserve command link power if they support spread spectrum modulation.

Referring to FIG. 8, in one embodiment each of the microradios 110 is illustrated as having the conductive coating 124 coupled to an electrode 122 that exists at the base of the module. Thus the encapsulation of the modules in a conductive material such as a conductive grease renders the module attachable to any surface it contacts and more importantly, to a surface of an antenna.

Referring now to FIG. 9, based on component estimates it is possible to layout a footprint estimate for the nanosecond microradio. This microradio shown in FIG. 9 is a 2,000 by 2,500 nm device 200 containing a complete microradio, including a command receiver, a rectifier and transmitter. The size is predominated by the storage capacitor 202, the controller 204, and three coupling electrodes 206. Power participation and consumption are not issues as energy is drawn parasitically from the antenna, even between oscillator bursts. The weight is estimated at a few picograms and the size is 2,500 nm by 2,500 overall, clearly invisible to the unaided eye. Note that when embedded in nanoscale components, rectifier 208 constituting a charge switch, frequency detector 210, oscillator/amplifier 212 and trigger 214 do not contribute significantly to overall size. Note, the two elements primarily determining device size are the energy storage capacitor and the antenna coupling electrodes.

Three dimensional view of the module is shown in FIG. 10. The design has two layers 220 and 222. The primary layer 220 holds most of the electronics. The second layer 222 is allocated for two functions. First, some sort of bonding agent is needed above the electrodes to ensure good contact with the target antenna. This contact can be mechanical, electrical, electromechanical, or some combination. The rest of the second layer provides additional room for a bank of energy storage capacitors.

What is provided by the type of module described above is inexpensive, unobtrusive microradio whose non-optimal response can be compensated for by numbers of microradios and by having an exceptionally large aperture, high power amplifier on the interrogator so that large amounts of power can be projected towards the microradio ensemble to charge the inefficient small radios.

Monitoring of Explosives

Having described a number of microradio transponder configurations since they can be manufactured in submicroscopic sizes and even nanometer sizes, they may be stealthfully deployed on or at explosives to monitor their existence, place of manufacture, date of manufacture, explosive type, serial or model numbers and in some instances location history.

The subject microradio transponders operate in a mode where they declare what they are attached to. For instance, when interrogated the microradio transponder can be configured to send a code that identifies the explosive device as a "shock tube".

Another approach is to have the tags respond with a serial number. A priori knowledge would then indicate what material the specific serial number is attached to.

If the microradio transponders respond with a predefined CDMA code, it is possible to sort out all of the transponders at the same time. Alternatively, the transponders may have specific time delays to help sort out the multiple tags in one place problem.

Figure 11A:
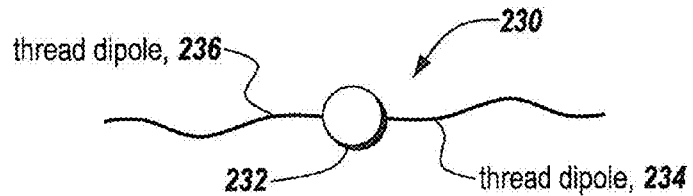
Figure 11B:
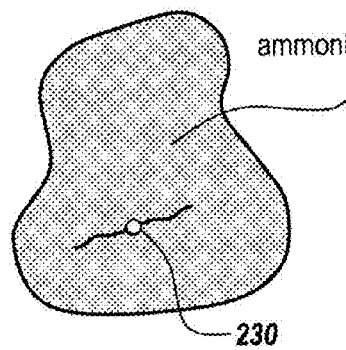
Figure 11C:
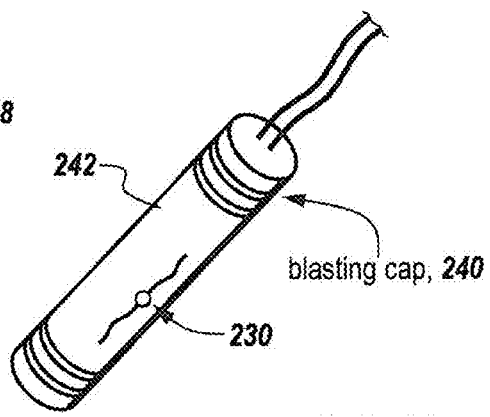
Figure 11D:
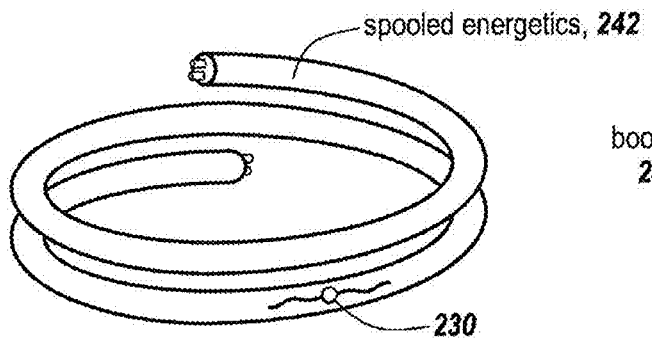

As illustrated in FIG. 11B, in one embodiment of the subject invention, a microradio 230 is shown having an electronics module 232 which bisects a thread dipole 234, with the configuration being nearly invisible to the naked eye. Electronics module 232 is nearly invisible as being a mere spec, whereas the dipole whiskers 234 and 236 are 100× thinner than the human hair. This permits placing the complete microradio in a number of locations on or adjacent to explosives or explosive material. As illustrated in 11B the microscopic microradio is adhered to a bag 238 of ammonium nitrate thus to be able to trace the ammonium nitrate from its point of manufacture and bagging to its ultimate destination and use.

Referring to 11C, a blasting cap 240 includes a tube 242 on which microradio 230 is placed.

Referring to 11D spooled energetics 242, be it detonation cord or the like, is provided with a microradio 230 along the length thereof as illustrated.

Figure 11E:
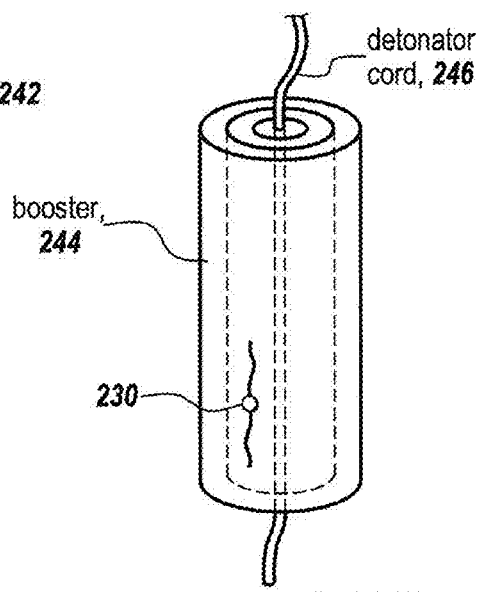

Moreover, as illustrated in FIG. 11E a booster 244 is shown in which a detonator cord passes through a central aperture, with the booster being provided with a virtually undetectable microscopic microradio 230 as illustrated.

Referring to FIG. 11F, a PBX sheet 248 is provided with a nearly invisible microradio 230 adhered to the surface of the sheet, whereas in. FIG. 11G plastic explosives 250 such as C3, C4 or SEMTEX are provided with a microradio 230 either on the surface or entrained therein.

Referring to FIG. 11H a shock tube 252 having a PDTN powder 254 adhered within the shock tube is provided with a spark discharge module 256 that when energized produces a shockwave 258 focused on a secondary high explosive 260. Shock tube 252 in one embodiment is provided with a nearly invisibly microradio 230 which may be adhered to the tube itself.

It will be appreciated that there are a wide variety of explosives and explosive materials that can be tagged with a microradio transponder at manufacture to provide the identity and serial number of the explosive, the date of manufacture, as well as its type and constituents. Since these types of explosives and explosive materials are manufactured in the hundreds of millions of pounds each year, it will be appreciated that keeping track of such explosive materials is indeed a daunting task.

However, by using microradios which are virtually undetectable and thus not easily removable, their presence and thus the presence of the explosive may be detected by interrogators to establish the existence of the explosive and its origin.

The subject microradio transponders may be utilized in three environments. The first is illustrated in 12A, which involves placement on or at non-metallic material packing, with the microradio transponder being self enclosed. In 12A for instance, the drawstring 270 on a bag 272 carries a microradio transponder 230, such that the bag and its contents are tagged through the utilization of the tagged drawstring.

Figure 12C:
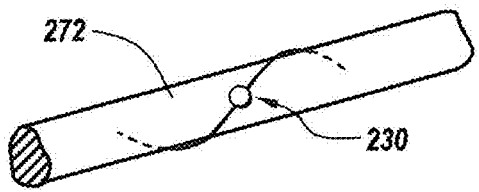
Figure 12D:
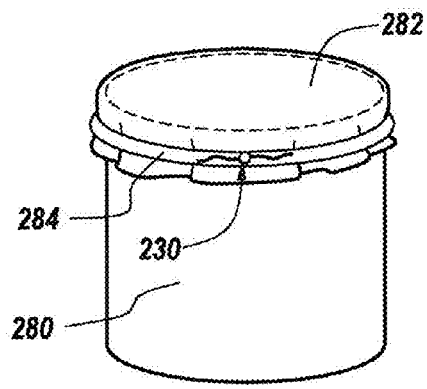
Figure 12E:
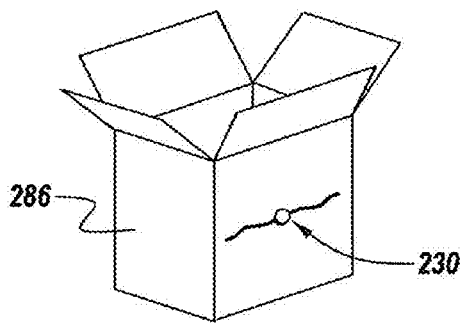

As illustrated in FIG. 12B, a label 274 may be provided with an almost invisible microradio transponder 230, whereas as shown in FIG. 12C, microradio transponder 230 may be wrapped around 276. As illustrated in FIG. 12D, a container 280 having a cap 282 may be sealed with an O-ring 284 that carries the nearly invisible microradio transponder 230.

Finally, material 286 used to package explosives may be provided with the aforementioned nearly invisible microradio 230.

In all of these embodiments the microradio is adhered to or adjacent non-metallic material.

Referring to FIG. 13A, there are a class of devices in which the subject microradio transponders are used in conjunction with a metallic substrate. In one embodiment the metallic substrate is an ultra-thin metallic backplane 290 provided with nearly invisible microradio transponder 230. This is done by adhering transponder 230 to a thin dielectric adhesive 292. The metallic substrate may be a packaging label, a holographic label or a retro reflective label, with the metallic material in providing a reflector for the emissions of the microradio, thus to provide range extension.

As illustrated in 13B, the microradio transponder may be camouflaged by mounting it on a metal hinge 294 applied to a box or lid 296.

It will be appreciated that when the microradios are spaced from a metallic surface, the metallic surface may act as a reflector given proper impedance matching.

Finally, with respect to FIG. 14, in another embodiment, microradio transponder 230 may be entrained in an adhesive 300. If the adhesive is conductive the antenna is electrically connected to the adhesive. The microradios may be entrained in the adhesive and sprayed onto a metallic substrate. In this case, each radio must contain a small adaptive matching circuit that minimizes power reflected back into the radio when it transmits a small burst. These matching circuits are known in the art, but must be implemented in a very small package to be consistent with radio particles. Therefore, the inductance and capacitance available for matching will be limited due to the potentially large volumes of these parts and the small volume of the radio particle. Provided that matching can be somewhat attained, it is possible to put the radios in conductive paint in order to connect an ensemble of radios to a conductive material which then functions as a radiating element.

Conversely, it is possible to put the radios in a conductive adhesive and spray them on a non-conducting surface. In this case, the mass of conductive adhesive forms the radiating element. The ensemble of radios within the adhesive must each adaptively impedance match to the adhesive in order to efficiently radiate.

When the adhesive is non-conductive, each microradio transmits radiation independently using an antenna that must be built into the particle. The dipole wires shown earlier are but one example of possible microantennas. Care should be taken to use non-polar, low-loss liquid adhesives in order to minimize dissipation within the adhesive.

In all of these cases, the colocation of many small radios will lead to some degree of phase locking and coherent transmit signal combination.

As will be appreciated, when the microradios are entrained in a slurry or spray, the microradios are almost invisible.

Explosives or explosive material can be detected from its point of manufacture throughout its lifetime, and also throughout the world. Interrogators either terrestrially based, airborne or spaceborn may be used to track tagged explosive material due so as to be able to trace and in some cases interdict the use of the explosive. Because the microradio transponders are so small, they are not easily visible on the explosive or in the explosive material so it is unlikely that they could be removed or ripped off. Note, the likelihood of detection of such microradio transponders is remote. This means that the microradio transponders offer cradle-to-grave traceability for the explosives or the explosive materials.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. A method for detecting and identifying explosives during the entire lifecycle of the explosive, comprising the steps of:
    affixing a microradio transponder of nearly invisible submicroscopic size to the explosive at the time of manufacture such that the transponder is placed discretely at the explosive during manufacture or is integrating into the explosive material itself, the microradio transponder having a rectifier including a final capacitor and a hysteretic switch to allow the final capacitor in the rectifier to charge up for a relatively long period of time to permit a foreshortened antenna to be nearly invisible, the antenna including a thread dipole antenna that is of nearly invisible submicroscopic size and including coding to indicate at least the place of manufacture of the explosive;
    irradiating an area suspected to contain explosives with an interrogating beam; and,
    detecting radiation from the microradio transponder and the information contained therein at long ranges due to the hysteretic switch despite the small nearly invisible size of the antenna, thereby to trace the explosive manufacturer for providing worldwide tracking and detection of explosives.

2. The method of claim 1, wherein the explosive includes explosive material and wherein the microradio transponder is embedded in the explosive material.

3. The method of claim 1, wherein the coding additionally includes one of explosive type, date of manufacture, the identity of the manufacturer and serial number.

4. The method of claim 1, wherein the microradio transponders are located within shipping labels.

5. The method of claim 1, wherein the microradio transponders are affixed to blasting caps.

6. The method of claim 1, wherein the microradio transponders are affixed to spooled energetics.

7. The method of claim 6, wherein the spooled energetics include detonator cords.

8. The method of claim 1, wherein the microradio transponder is affixed to a booster.

9. The method of claim 1, wherein the microradio transponder is affixed to a PBX sheet.

10. The method of claim 1, wherein the microradio transponder is attached to or within a plastic explosive.

11. The method of claim 1, wherein the microradio transponder is affixed to a shock tube.

12. The method of claim 1, wherein the microradio transponder is affixed to a drawstring of a bag.

13. The method of claim 1, wherein the microradio transponder is affixed to a detonation cord.

14. The method of claim 1, wherein the microradio transponder is affixed to or contained within a sealing ring.

15. The method of claim 1, wherein microradio transponders are affixed to packaging for explosives.

16. The method of claim 15, wherein the packaging is non-conductive.

17. The method of claim 15, wherein the packaging includes a metallic substrate.

18. The method of claim 17, wherein the microradio transponder is spaced from the metallic substrate by a dielectric material.

19. The method of claim 18, wherein the dielectric material includes a dielectric adhesive.

20. The method of claim 17, wherein a metallic substrate is taken from the group of labels consisting of a packaging label, a holographic label and a reflective label.

21. The method of claim 17, wherein a metallic substrate includes a metallic hinge.

22. The method of claim 1, wherein the microradio transponder is entrained in an adhesive.

23. The method of claim 22, wherein the adhesive is conductive and wherein the microradio transponder includes an antenna electrically isolated from the conductive adhesive.

24. The method of claim 22, wherein the adhesive is sprayed onto a substrate.

25. The method of claim 24, wherein the substrate is non-metallic.

26. The method of claim 24, wherein the substrate is metallic.

27. The method of claim 1, wherein the microradio transponder includes a rectenna circuit for boosting the power output thereof.

28. The method of claim 1, wherein the microradio transponder includes a modulator for modulating the signal therefrom in accordance with the information to be transmitted.

29. The method of claim 1, wherein the microradio transponder is activated only upon the receipt of a predetermined code carried by the interrogating beam, thereby to permit selecting a predetermined microradio transponder for poling.

30. The method of claim 1, and further including the step of providing an alarm when an explosive has been detected.

31. The method of claim 1, and further including the step of providing an alarm when explosive material has been detected.

32. The method of claim 1, wherein the interrogating beam is provided by a terrestrially based interrogator.

33. The method of claim 1, wherein the interrogating beam is generated from an airborne location.

34. The method of claim 32, wherein the interrogating beam is generated from a satellite.

* * * * *